June 1, 1937.  T. J. MURPHY  2,082,506
ALTERNATING CURRENT MOTOR
Filed Feb. 23, 1935   3 Sheets-Sheet 1

INVENTOR
Thomas J. Murphy
BY
Wooster & Davis
ATTORNEYS

June 1, 1937.  T. J. MURPHY  2,082,506
ALTERNATING CURRENT MOTOR
Filed Feb. 23, 1935  3 Sheets—Sheet 2
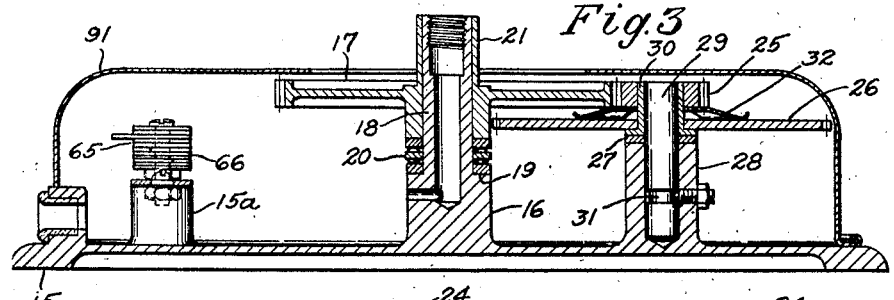
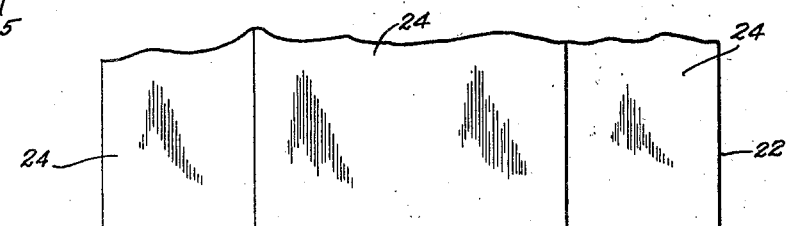
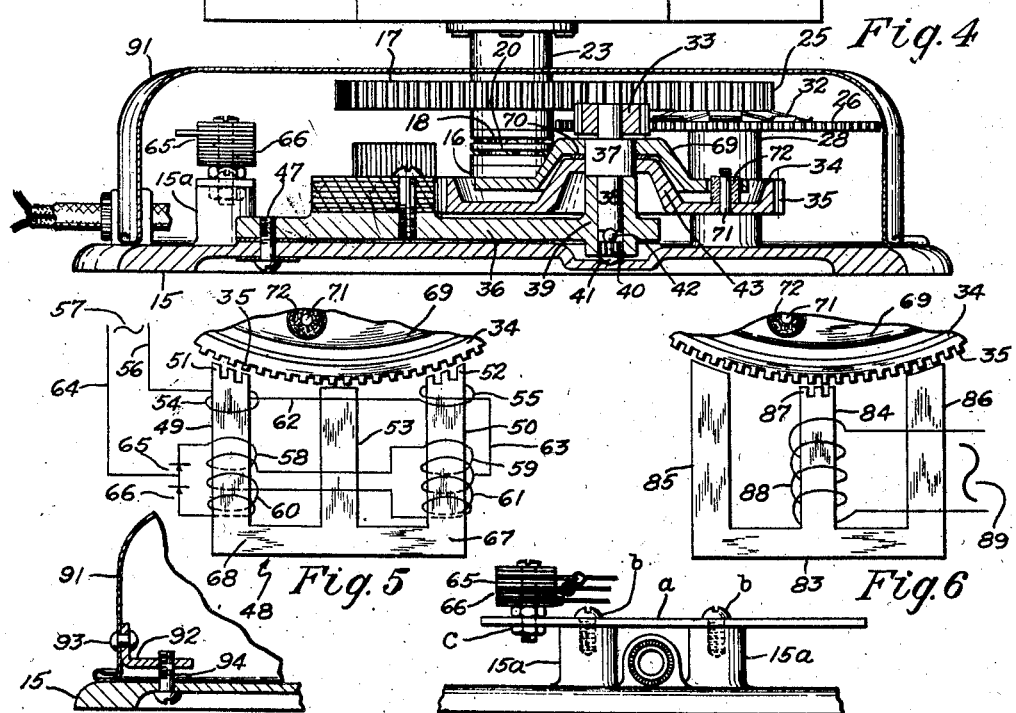
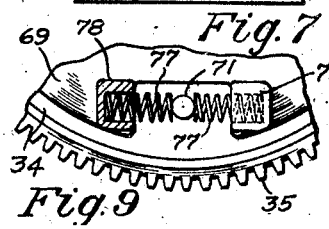
INVENTOR
Thomas J. Murphy
BY
Wooster & Davis
ATTORNEYS June 1, 1937.  T. J. MURPHY  2,082,506
ALTERNATING CURRENT MOTOR
Filed Feb. 23, 1935   3 Sheets-Sheet 3
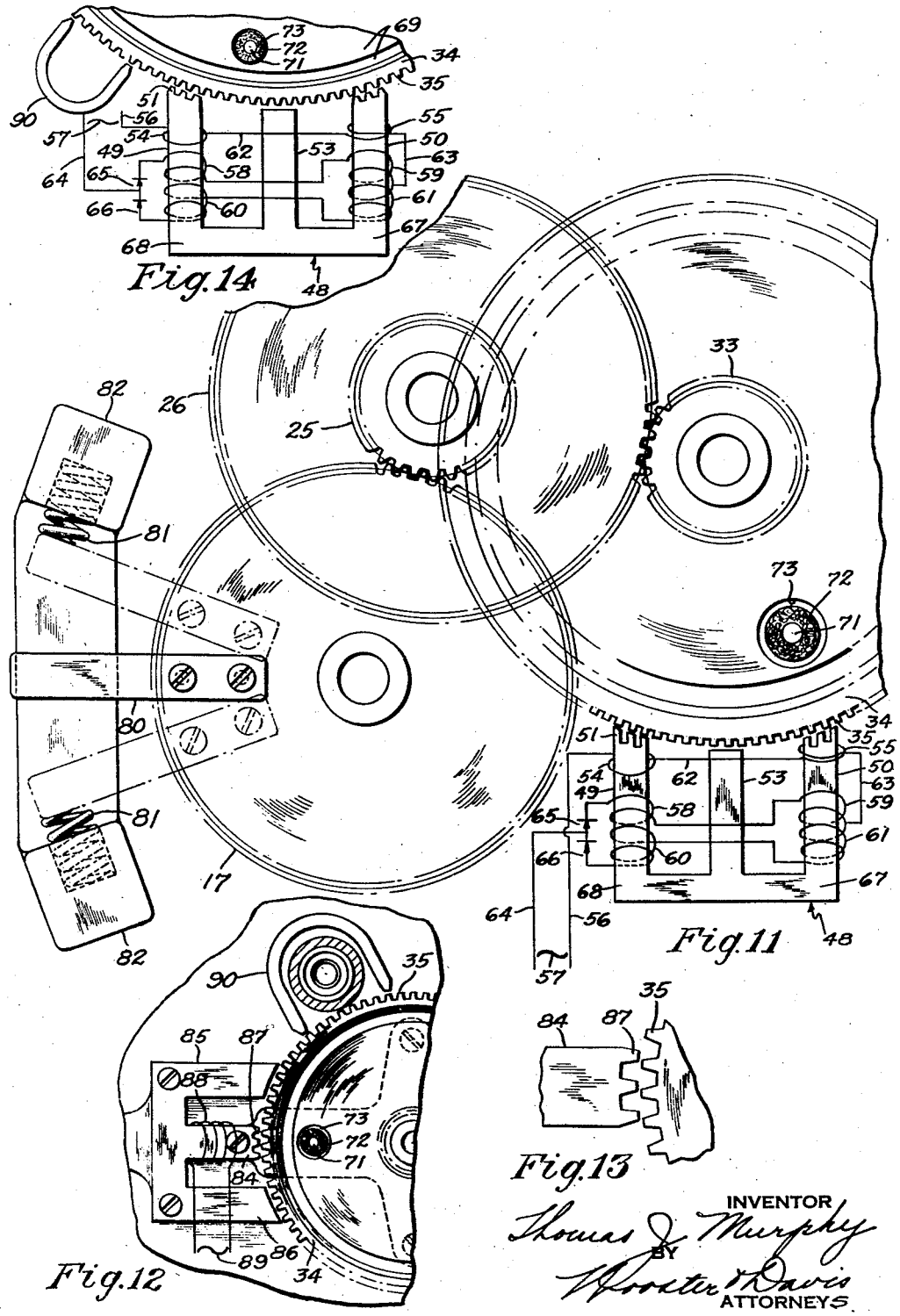

Patented June 1, 1937

2,082,506

UNITED STATES PATENT OFFICE 2,082,506

ALTERNATING CURRENT MOTOR

Thomas J. Murphy, Stamford, Conn.

Application February 23, 1935, Serial No. 7,795

12 Claims. (Cl. 172—275)

This invention relates to a synchronous motor and more particularly to a low speed synchronous motor.

It is an object of the invention to provide a motor of very simple construction and which operates quietly and at uniform speed so that it is well adapted for use in operating turntables for phonographs and the like.

It is another object of the invention to provide a low speed motor which requires but a relatively small current to produce a heavy torque so it is well adapted for operating, rotating or oscillating display stands or panels for advertising purposes in a store window or similar locations.

Another object is to provide such a motor which is selfstarting, and which can be arranged to oscillate or operate automatically back and forth in opposite directions at a uniform speed and automatically reverse itself at the end of each movement.

With the foregoing and other objects in view as will become apparent as the description proceeds, I have devised the construction disclosed, but it is to be understood I am not limited to this specific construction but may use modifications and variations within the scope of the claims.

In the accompanying drawings Fig. 1 is a top plan view of the motor showing it as applied for driving the turntable of a phonograph but with parts broken away to more clearly show the construction.

Fig. 3 is a vertical section substantially on lines 3—3 of Fig. 1;

Fig. 4 is a vertical section substantially on line 4—4 of Fig. 1;

Fig. 5 is a diagram of the wiring for the motor;

Fig. 6 is a similar diagram showing a modification;

Fig. 7 is a detail section on line 7—7 of Fig. 1;

Fig. 8 is an elevation showing the mounting for the rectifier;

Fig. 9 is a detail plan view showing a modification;

Fig. 10 is a partial section and partial elevation of the construction of Fig. 9;

Fig. 11 is a diagrammatical plan view showing how this motor may be caused to oscillate, that is rotate partially in one direction and then automatically reverse and rotate the same amount in the opposite direction and so on;

Fig. 12 is a detailed view showing a selfstarting feature;

Fig. 13 is a detail on an enlarged scale of one of the pole sections of the magnet and a portion of the rotor of Fig. 12; and Fig. 14 is a detail view showing another application of the selfstarting feature of Fig. 12.

Figure 1:
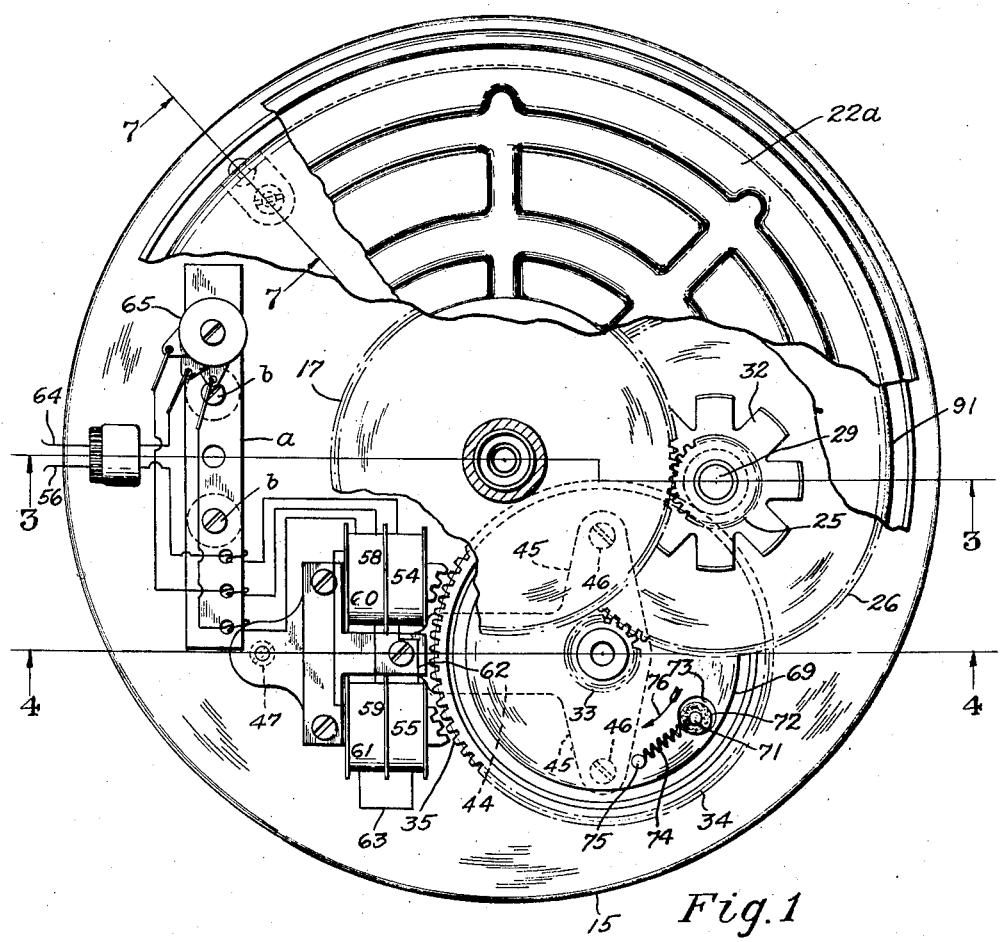

Referring first to Figs. 1 to 5 inclusive, the motor comprises a base 15 of any suitable material and shape, that shown being substantially circular and of cast iron having a central upwardly extending bearing lug or boss 16 provided with a bearing for a main gear 17. The bearing may be of different constructions, but that shown includes a reduced portion 18 on which the gear turns and providing a shoulder 19 on which is a ball thrust bearing 20 which supports the gear 17. The gear has an upwardly extending central boss 21 on which may be mounted any suitable display device or other element to be rotated. In Fig. 4 a display device is shown at 22 including a mounting element 23 at its lower end seating upon the boss 21. The upper portion of the display element 22 is broken off in Fig. 4 but it will be evident it may be of any desired height and shape desired. In the present instance it has a plurality of panels 24 on which the advertising or display matter may be mounted, such for example as printing, illustrations, or the articles themselves if they are small.

Meshing with the gear 17 is an intermediate driving pinion 25 mounted to rotate with an intermediate gear 26 mounted on a suitable bearing 27 on an upstanding boss 28. In this structure shown a stud 29 is mounted in the boss to extend upwardly therefrom and the gear 26 and pinion 25 are mounted on the bushing 30 to turn on this stud. The stud has a groove 31 into which the end of a securing screw extends to secure the stud to the boss. If desired, a thrust bearing 27 may be a ball bearing to reduce friction, but as the gear 26 and the pinion 25 are of relatively light weight a flat thrust bearing as shown is ordinarily satisfactory. It is preferred that the pinion 25 ordinarily be not rigidly connected to the gear 26. It is mounted with a forced fit on the sleeve 30 and a split spring washer 32 is located between and frictionally engages the sides of the gear 26 and the pinion 25 so that the gear 26 may turn relative to the pinion 25, the gear 26 being loose on the sleeve 30, if anything should happen to prevent rotation of the pinion. But there is sufficient friction between the washer and the gear so that the gear will drive the pinion under normal operation. This kind of drive will also permit a relative turning movement between the pinion and the gear if for any reason the rotor of the motor and the gear 26 should be suddenly stopped and thus prevent damage to the mechanism.

The gear 26 meshes with the driving pinion 33 connected to the rotor 34 of the motor. This rotor is of magnetic material and preferably of cast iron although not necessarily so. In its outer periphery it has a plurality of transverse pole or teeth portions 35 and it is mounted to rotate on a bearing in a support or bracket 36. This improved mounting as shown in Fig. 4 comprises a central stud 37 to which the rotor 34 is secured by any suitable means, this stud having a reduced lower portion 38 extending into a bearing 39 in the support or mounting 36. In the lower end of this opening in the support is a hardened plug 40 having a tapered lower end 41 seated in a recess in the top of the base 15, and between this plug and the lower end of the pin 38 is a hardened steel ball 42 forming a thrust bearing for the stud. It will be noted that the central portion of the rotor 34 is offset upwardly as indicated at 43 forming a sort of umbrella portion into which the bearing 39 extends and this is such a height that substantially the center of this bearing is substantially in the plane midway between the top and bottom surfaces of the peripheral portion of the rotor. This causes torque on the rotor to be in substantially the central plane of the bearing, reducing to a minimum the tendency of the torque on the rotor to rock the rotor laterally and cramp it in the bearing, thus reducing friction and insuring the rotor will operate indefinitely in its proper location. The driving pinion 33 is secured to the upper portion of the stud 37 so as to be driven thereby.

The support or mounting 36 includes the body portion 44 and two lateral arms 45. The bearing 39 is at the end of the body 44 between the arms 45, and two securing screws 46 pass through the base 15 and are threaded into the arms 45, while a third securing screw 47 passes through the base and is threaded into the free end of the body 44. By means of these screws the support 36 may be adjusted or rocked on the tapered bearing 41 to adjust the plane of the rotor and keep it horizontal and also adjust the relation of the pinion 33 with respect to the gear 26.

Associated with the rotor and the pole portions 35 is a magnet 48, preferably of a laminated structure of good magnetic material, such for example as soft iron. This magnet has legs or poles 49 and 50 provided with teeth or pole portions 51 and 52 respectively of substantially the same size and spacing as the pole portions 35 of the rotor but the teeth or pole portions 51 are offset from the teeth or pole portions 52 one-half the pitch or spacing of the pole portions 35 as indicated in Figs. 1 and 5. That is, if the pole portions 51 are opposite or in alignment with pole portions 35 on the rotor then the pole portions 52 are in alignment with the spaces between pole portions 35 and vice versa for a purpose to be described later. The magnet 48 is also preferably provided with a central leg 53 between the two legs 49 and 50 and having a plain end without teeth adjacent the periphery of the rotor. Although this leg is not necessary it is preferred as giving better operation.

The magnet 48 is excited as indicated by the wiring diagram of Fig. 5. The leg 49 is embraced by A. C. coil 54 in series with another A. C. coil 55 embracing the leg 50, but the two coils, as indicated, are wound to magnetize their respective legs in the opposite sense. One end of the coil 54 is connected by the lead 56 to one side of a source of A. C. supply indicated at 57. The two legs or poles 49 and 50 are also excited by uni-directional or D. C. coils. Thus there is coil 58 embracing the leg 49 connected in series with the coil 59 embracing the leg 50 and these two coils are wound in the same sense, as indicated on the drawings. There is also another uni-directional or D. C. coil on each leg as indicated at 60 and 61 embracing the legs 49 and 50 respectively. These two coils 60 and 61 are also in series with each other and are wound in the same sense but are wound in the opposite sense to coils 58 and 59 as indicated on the drawings. The coils 54 and 55 are connected by the lead 62 and the other end of the coil 55 is connected by lead 63 between the coils 59 and 61 as indicated. The other lead 64 from the other side of the A. C. supply is connected to the coils 58 and 60 but between the lead 64 and the coil 58 is a rectifier 65 and between the coil 60 and lead 64 is a rectifier 66 permitting flow of current in the same direction. In the arrangement shown current can flow from the lead 64 to coil 58. It cannot flow from lead 64 to coil 60, and on the other hand it can flow from coil 60 to lead 64 but cannot flow from coil 58 to this lead. Although two rectifiers 65 and 66 are indicated a single dry plate rectifier may be used with the lead 64 connected to the center plate and the leads to the coils 58 and 60 connected to the outer plates respectively.

It will be apparent that with this circuit the unidirectional coils 58, 59, 60 and 61 always magnetize the poles 49 and 50 in the same sense, but that the A. C. coils 54 and 55 magnetize them in the opposite sense to each other. Therefore, if at any given moment, we assume current enters through lead 56 pole 49 would be magnetized in one sense by coil 54 while the pole 50 would be magnetized in the opposite sense by coil 55. This current also passes through coils 61 and 60 to lead 64 but cannot pass through coils 59 and 58 because of rectifier 65. As the coil 61 is wound to magnetize pole 50 in the same sense as coil 55 the magnetic fluxes of these two coils will be added to each other giving maximum flux in pole 50, and while the coils 54 and 60 are wound to magnetize pole 49 in the opposite sense they will cancel each other giving zero flux in pole 49. The path of the flux is from the pole 50 to the rotor 34 to the central pole 53 and back through the connecting portion 67 of the magnet 48. On reversal of the current for the next half of the cycle under our assumption it enters through the lead 64, passing through the coils 58 and 59 and then through the coils 55 and 54 to lead 56. As coils 58 and 54 are wound so they magnetize pole 49 in the same sense their fluxes will add giving a maximum flux through the pole 49, the rotor 34, central pole 53 and connecting portions 68 of magnet 48, and as coils 55 and 59 are wound to magnetize pole 50 in the opposite sense they cancel each other producing no flux through the pole 50. During this half of the cycle there is no current going through the coils 60 and 61 due to the rectifier 66. It will therefore be evident that with this arrangement of coils and rectifiers the poles 49 and 50 are alternately magnetized to the maximum extent, and while one is magnetized to its maximum extent or has maximum flux the other is demagnetized or has zero flux. When the rotor 34 is running the pole 49 has zero flux. When the poles 35 on the rotor are in alignment with or opposite pole portions 51 as indicated in Figs. 1 and 5, while at this time there is maximum flux in pole 50 and pole portions 52 which are opposite the spaces between pole portions 35 of the rotor. This causes maximum torque or pull on the pole portions 35 of the rotor tending to pull them into alignment with the pole portions 52. As they come into alignment the flux in the pole portions 52 is reduced to zero while the flux in the pole portions 51 is brought to a maximum, but at this time the pole portions 51 are in alignment with the spaces between pole portions 35 on the rotor and therefore tend to pull them into alignment. This operation is repeated for each cycle so that the poles 49 and 50 alternately exert a torque from the pole portions of the rotor tending to rotate it, and the rotor is kept rotating at a uniform speed in synchronism with this alternate magnetization of poles 49 and 50. It will be evident that the speed of the rotor depends on the frequency of the A. C. current and the number of pole portions 35 in the rotor. It will thus be seen that the unidirectional windings 58, 59, 60 and 61, or that is the windings for the rectified current, continuously polarize the cores they are around in the same sense regardless of the direction of current from the A. C. supply, while the A. C. coils 54 and 55 alternately polarize their respective cores in opposite senses and at any given instant (except at zero current) are opposite to each other.

For greater power it is only necessary to locate more of the poles 48 and its energizing coils about the rotor 34, but for most quiet operation they should be located in relation to one another at angles less than 180°.

To facilitate starting of the motor a snubber or inertia member 69 is mounted on the stud 37 for the rotor for limited relative rotating movement thereon. It rests upon a fiber washer or disc 70 so as to have a frictional drive between the rotor and the snubber, this snubber having sufficient weight to provide sufficient inertia at the critical point where the rotor draws into step or synchronism with the magnetization of the magnet 48 as will be more fully described presently. Also, mounted on the rotor 34 is a pin 71 embraced by a resilient cushioning element 72 which may be either resilient rubber or felt, and this extends into an opening 73 in the snubber 69. The opening is of larger diameter than this cushioning element so as to permit limited relative turning movement between the snubber and the rotor. I have found that for best results the clearance should be at least half the pitch of the poles 35 on the rotor. If now in starting the motor the operator gives the rotor a spin to bring it to a speed somewhat above the synchronous speed as it slows down to the synchronous speed it is supposed to come into step and keep going. Without this snubber arrangement it does not always do this because as the rotor slows up and just before it gets to the critical or synchronous speed there may be a sudden arresting of its speed to bring it into step and this arresting action is sufficient quite often, because of the inertia of the rotor, to prevent its picking up to the synchronous speed and the rotor stops. This is overcome in the present construction by the relative heavy disc or snubber 69 free to turn on the shaft or stud 37 for the rotor 34 and resting on the fiber washer or disc 70. With this arrangement it will be evident that when the rotor 34 is speeded up the inertia member or snubber 69 will also be brought up to speed by the friction drive through the disc 70 and the pin 71, but when there is the sudden arresting of the rotor 34 as it pulls into the synchronous speed the momentum of the snubber 69 tends to carry it forward. However, the friction drive 70 permits the rotor 34 to momentarily slow up and then this friction drive transmits power from the element 69 sufficient to bring the rotor to the synchronous speed and it does not stop. It also prevents or at least reduces to a minimum the phenomenon known as "hunting of the rotor". This is further reduced by the resilient cushioning element 72 in the opening 73.

A convenient way of mounting the rectifiers is shown in Figs. 1 and 8. A bar (a) may be secured by any suitable means such as screws (b) to upright lugs or bosses 15a on base 15. This rectifier is preferably of the dry plate type such for example as is known as "Rectox" and the lead 64 connected to the center plate so a single assembly can function to provide both rectifiers.

I have also discovered that if a light spring is used to crowd or draw the resilient element 72 over against the edge of the opening 73 in a circumferential direction the motor will be self starting and will positively start under load, and invariably in the direction in which the spring is pulling the pin 71 and element 72 against the side of the opening in the snubber or inertia element 69. This is shown in Fig. 1 where the light spring indicated at 74 is shown as connected at one end 75 to the snubber or inertia element 69 and at the other end to the pin 71 so as to turn the element 69 sufficiently on the rotor to bring the side of the resilient element 72 against the edge of the opening 73. When the circuit is closed through the electrical device as described there is a slight oscillation of the rotor as the current reverses through the coils 54 and 55. This oscillatory movement is retarded or opposed in one direction by the inertia of the element 69 and the spring 74. It is also opposed or retarded in the opposite direction by the inertia of the element 69 but is assisted in this direction by the spring 74. This oscillation is therefore unbalanced and quickly builds up greater movement in one direction than in the other and in a short time is sufficient to carry the rotor up to synchronous speed in that direction so that it then starts rotating, which will be clockwise or in the direction of the arrow 76 with the arrangement shown in Fig. 1.

Figure 2:
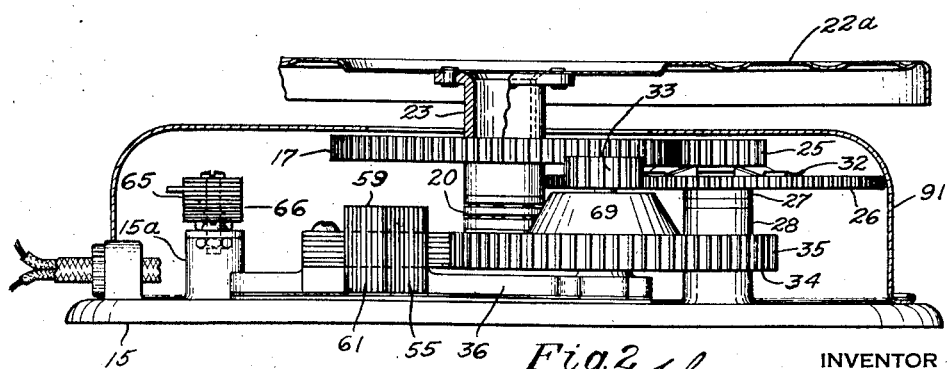
Fig. 2 is a side elevation with the cover and the turntable in section.

In Figs. 1 and 2 a phonograph turntable 22a is shown as mounted on the driven element 23 while in Fig. 4 a display stand 22 is shown as mounted on this element. These are merely examples of uses for this motor and it will be evident it is adapted for other uses as well.

Instead of the rubber, felt or other resilient bushing 72 I may use a pair of light springs 77 on opposite sides of the pin 71 as indicated in Figs. 9 and 10, the other end of the springs being carried by the snubber or inertia element 69. In the present instance they are shown as seated in the sockets 78 in lugs 79 on the inertia element. These springs assist in bringing the rotor into synchronism when starting the motor and also preventing its hunting in operation.

I have discovered that this motor may be made to rotate alternately in opposite directions and automatically reverse itself at the limit of its movement in either direction. This will considerably increase its value for use in display stands and for other uses where it may be desired to have the display or the like move alternately in opposite directions. This arrangement is shown in Fig. 11. In this arrangement a radial arm 80 is fastened to the gear 17, or some other of the rotating elements, and at suitable distances on opposite sides of this arm in the path of movement thereof are resilient abutments or buffers 81. In the present case they are shown as coil springs mounted in suitable supports 82. In this arrangement also, the gears 25 and 26 should be secured together. When the motor is once started it will continue to oscillate back and forth at an absolutely uniform speed, because as it rotates to bring the arm 80 into engagement with one of the abutments 81 this abutment is compressed until the motor is brought to a stop and then the spring gives the arm, and through the gears the rotor, a sufficient start in the opposite direction so that the motor starts in this direction, and thus the motor will keep on reversing itself automatically and operating alternately in opposite directions.

I have also found that this motor will operate with a single A. C. coil on the center pole piece of the three pole magnet if the rotor and the magnet are so constructed and arranged that the hysteresis losses in the magnet are less than in the rotor. Such an arrangement is shown in Fig. 6 in which the laminated magnetic core 83 has three legs or pole portions 84, 85 and 86. In this case it is preferred that the free ends of the outer legs 85 and 86 be plain or without teeth while the free end of the central leg 84 be provided with teeth or pole portions 87 similar to and corresponding in spacing with the teeth or pole portions 35 on the rotor 36. A single A. C. coil 88 embraces the central leg 84 and is connected to any suitable source of A. C. supply 89. It is found that with this arrangement best results are obtained if there are no teeth or notches on the ends of the outer legs 85 and 86 because if they are made without these notches the reluctance of the gap is reduced thereby increasing the flux and thus increasing hysteresis losses in the rotor and consequently increasing the torque. With no teeth on the outer poles there is minimum reluctance in the magnetic circuit when the teeth on the rotor are in alignment with the teeth on the center leg of the magnet or stator, thereby increasing the hysteresis losses in the rotor element and causing a relative lag in the flux change between the rotor and stator at the moment of reversal of the current in the coil 88, which produces rotation of the rotor. In other words the polarity of the rotor is complementary to the stator and would be in phase with it at all times if there were no hysteresis losses relative to rotor and stator. If hysteresis losses in the rotor are increased relative to those in the stator (such for example as using material having high hysteresis loss, such as cast iron for the rotor, while for example soft iron is used for the stator or magnet) I secure the above result and increase the torque. There is a variable gap between the rotor and the central leg of the magnet because of the teeth 87, but there is a constant gap on the return magnetic circuits at the outer parts of the rotor and the outer legs of the stator, which makes for high flux density on the teeth, and therefore there is lower reluctance between the rotor and the outer poles of the stator at all times. Therefore, for a given magnetization there is maximum flux in the magnetic circuit when the rotor teeth and the teeth 87 are in alignment if there are no teeth on the outer legs of the magnet, thus increasing the torque. It is not necessary that the rotor and the magnet be of different materials as they may be designed and associated so that the hysteresis losses are greater in the rotor than in the stator, but making them of different materials is a very effective and easy way of securing this effect, and greater hysteresis losses and therefore greater lag can be secured if we use cast iron, for example, in the rotor.

I have shown an arrangement in Fig. 12 whereby this device of Fig. 6 can be made self-starting. For this a permanent magnet 90 is mounted with its poles adjacent the periphery of the rotor and with these poles so located that they are in alignment with two pole or teeth portions 35 of the rotor when the teeth or pole portions 87 are out of alignment with the pole portions 35 of the rotor, preferably at about intermediate the positions where the pole portions of the stator and the rotor are in direct alignment and the position where they are most out of alignment, as shown in Fig. 13. It will then be evident that the rotor will always come to rest in this position as the magnet 90 will stop the rotor with its poles in direct alignment with the teeth 35 of the rotor. Then when A. C. current is applied to the coil 88 there is an oscillation set up in the rotor because it is drawn in one direction when the magnetization of the stator is at a maximum and is drawn in the opposite direction by the magnet 90 when the current and magnetization go through zero. This oscillation soon builds up sufficiently to get the rotor up to synchronous speed so that it starts rotating. The inertia element 69 and the resilient connection between it and the rotor are effective in securing this operation.

This permanent magnet can also be used to make the motor using the coils and magnets of Fig. 5 self-starting as shown in Fig. 14. Here the magnet 90 is so arranged as to stop the rotor with its teeth 35 slightly out of alignment with the teeth 51 of the stator in one direction and slightly out of alignment with the teeth 52 of the stator in the opposite direction, preferably about intermediate the position where these teeth are in direct alignment and the position where they are most out of alignment. In this arrangement the poles 49 and 50 are magnetized alternately as above described, which will cause the rotor teeth to register alternately with the stator teeth and thereby set up an oscillation which increases up to synchronism speed so that it starts rotating.

It is preferable to use the inertia element or snubber 69 with all these forms and also either the resilient sleeve 72 in the opening in the snubber or the double light spring arrangement of Figs. 9 and 10, as they give much better operation.

Fig. 7 shows merely a convenient way of fastening an enclosing casing 91 over the mechanism to protect it. Any suitable number of angle members 92 are connected to the side walls of the casing by any suitable means such as rivets 93, and then the casing may be securely and removably mounted on the base by screws 94 passing through the base and threaded into the members 92.

In all the forms shown the torque and therefore the power may be increased by using more than one magnetizing element about the periphery of the rotor, and it will be evident that the rotor may be made large or small as desired. Thus the leverage of the pull of the magnet on the rotor may be increased and the number of magnets which may be used may be increased if the diameter of the rotor is increased. Also, as the poles of the magnet are located relatively close together the magnetic path through the rotor can be made very short thus greatly reducing the reluctance of the magnetic circuit over motors where the magnets are placed, for example, on diametrically opposite sides of the rotor.

Having thus set forth the nature of my invention, what I claim is:

1. In a synchronous motor, a rotor having spaced pole portions, a magnetic core comprising a plurality of spaced legs connected at one end, spaced poles on the outer legs arranged in inductive relation to said rotor, the poles on one leg being in alignment with poles on the rotor when the poles on the other leg are out of alignment with the poles on the rotor, two sets of coils, means for supplying uni-directional current to one set of coils, and means for connecting the second set of coils with an alternating current supply said latter coils being so connected as to alternately suppress the flux in the outer poles during each cycle.

2. In a synchronous motor, a rotor having spaced pole portions on its periphery, a magnetic core having spaced legs connected at one end and spaced poles at their free ends in inductive relation to the poles on the rotor, the poles on one leg being in alignment with poles on the rotor when the poles on the other leg are out of alignment with the poles on the rotor, exciter and working coils on the legs, means for supplying uni-directional current to the exciter coils, means for connecting the working coils to a source of alternating current, and said latter coils being wound to alternately suppress the flux of the first coils in the respective legs of the core in each cycle.

3. In a synchronous motor, a rotor having spaced pole portions on its periphery, a magnetic core having spaced legs connected at one end and in inductive relation to the poles on the rotor at the other ends, said legs having spaced poles at their free ends of substantially the same spacing as those on the rotor, the poles of one leg being in alignment with pole portions of the rotor when the poles of the other leg are out of alignment with the poles of the rotor, and means for magnetizing the legs alternately in the same sense with the flux in one leg decreased while that in the other leg is increased and both modulated always in constant ratio with the impressed current.

4. In a synchronous motor, a rotor having spaced pole portions on its periphery, a magnetic core having three spaced legs connected at one end, the outer legs having spaced pole portions at their free ends in inductive relation to the pole portions of the rotor, direct current exciter coils and working coils on the outer legs, means connecting said coils with a source of alternating current supply, a rectifier in the connection between one side of the supply and the exciter coils, and the working coils being wound to suppress the flux in the outer legs on each cycle.

5. In a synchronous motor, a rotor having spaced pole portions on its periphery, a magnetic core having spaced legs, said legs having spaced pole portions in inductive relation to those on the rotor and similarly spaced, exciting and working coils on the legs of the core, means for connecting said coils with a source of alternating current supply, and said coils being so wound that the working coils during each cycle alternately suppress the flux in the respective legs due to the exciting coils.

6. In a synchronous motor, a rotor having spaced pole portions on its periphery, a magnetic core having three spaced legs connected at one end, the outer legs having spaced pole portions in inductive relation with those on the rotor, exciter coils and working coils on the outer legs, and means connecting said coils with a source of current supply, said coils being so wound that the working coils alternately suppress the flux of the respective exciter coils to rotate the rotor.

7. In a synchronous motor, a rotor having spaced pole portions, a magnetic core comprising three spaced legs connected at one end, spaced poles on the outer legs arranged in inductive relation to said rotor, the poles on one leg being in alignment with poles on the rotor when the poles on the other leg are out of alignment with the poles on the rotor, direct current exciter coils for the outer legs of the core and working coils on said legs, means for connecting the working coils with an alternating current supply, said working coils being so wound as to alternately suppress the flux in the outer poles during each cycle, an inertia element rotatable with the rotor and having limited movement independent thereof, and a resilient yieldable means for transmitting motion from the rotor to said element.

8. In a synchronous motor, a rotor having spaced pole portions on its periphery, a magnetic core having spaced legs connected at one end and spaced poles at their free ends in inductive relation to the poles on the rotor, the poles on one leg being in alignment with poles on the rotor when the poles on the other leg are out of alignment with the poles on the rotor, exciter and working coils on the legs, means for connecting the working coils to a source of alternating current, said coils being wound to alternately suppress the flux of the exciter in the respective legs of the core in each cycle, an inertia element rotatable with the rotor, a frictional drive between the element and the rotor, and a resilient yieldable means for transmitting motion from the rotor to said element.

9. In a synchronous motor, a rotor having spaced pole portions on its periphery, a magnetic core having three spaced legs connected at one end, the outer legs having spaced pole portions at their free ends in inductive relation to the pole portions of the rotor, direct current exciter coils and working coils on the said legs, means connecting said coils with a source of alternating current supply, a rectifier in the connection between one side of the supply and the exciter coils, the working coils being wound to suppress the flux in the outer legs on each cycle, an inertia element rotatable with the rotor and having limited movement independently thereof, and a resilient yieldable means for transmitting motion from the rotor to said element.

10. In a synchronous motor, a rotor having spaced pole portions on its periphery, a magnetic core having spaced legs, said legs having spaced pole portions in inductive relation to those on the rotor and similarly spaced, exciting and working coils on the legs of the core, means for connecting said coils with a source of alternating current supply, said coils being so wound that the working coils alternately suppress the flux in the respective legs due to the exciting coils during each cycle, an inertia element rotatable with the rotor and having limited movement independently thereof, and a resilient yieldable means for transmitting motion from the rotor to said element.

11. In a synchronous motor, a rotor having spaced pole portions on its periphery, a magnetic core having three spaced legs connected at one end, the outer legs having spaced pole portions in inductive relation with those on the rotor, exciter coils and working coils, means connecting said coils with a source of current supply, said coils being so wound that the working coils alternately suppress the flux of the respective exciter coils to rotate the rotor, an inertia element rotatable with the rotor and having limited movement independently thereof, and a resilient yieldable means for transmitting motion from the rotor to said element.

12. In a synchronous motor, a rotor having spaced pole portions about its periphery, a magnetic core having spaced legs connected at one end and in inductive relation to the rotor at the opposite ends, said legs having spaced poles at their free ends of substantially the same spacing as those on the rotor, the poles of one leg being in alignment with pole portions of the rotor when the poles of the other leg are out of alignment with the poles of the rotor, means for magnetizing the respective legs alternately, a stop member driven by the rotor, and spaced resilient buffers in the path of movement of the stop member on opposite sides thereof to alternately stop the motor and reverse it.

THOMAS J. MURPHY.